United States Patent
Hapsari et al.

(10) Patent No.: US 11,265,956 B2
(45) Date of Patent: Mar. 1, 2022

(54) RADIO COMMUNICATION SYSTEM AND USER DEVICE

(71) Applicant: NTT DOCOMO, INC., Tokyo (JP)

(72) Inventors: Wuri Andarmawanti Hapsari, Tokyo (JP); Ryusuke Matsukawa, Tokyo (JP); Hideaki Takahashi, Tokyo (JP); Anil Umesh, Tokyo (JP); Sadayuki Abeta, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 1 day.

(21) Appl. No.: 16/300,383

(22) PCT Filed: May 11, 2017

(86) PCT No.: PCT/JP2017/017785
§ 371 (c)(1),
(2) Date: Nov. 9, 2018

(87) PCT Pub. No.: WO2017/195854
PCT Pub. Date: Nov. 16, 2017

(65) Prior Publication Data
US 2019/0124716 A1    Apr. 25, 2019

(30) Foreign Application Priority Data
May 12, 2016 (JP) .............................. JP2016-096560

(51) Int. Cl.
*H04W 88/02* (2009.01)
*H04W 76/27* (2018.01)
(Continued)

(52) U.S. Cl.
CPC ............. *H04W 76/27* (2018.02); *H04W 4/00* (2013.01); *H04W 48/18* (2013.01); *H04W 72/04* (2013.01);
(Continued)

(58) Field of Classification Search
CPC .. H04L 41/0668; H04L 41/0672; H04W 4/00; H04W 4/70; H04W 16/14;
(Continued)

(56) References Cited

U.S. PATENT DOCUMENTS 9,991,997 B2 *  6/2018  Fukuta .................. H04W 16/14
2013/0250925 A1 *  9/2013  Lohr .................. H04W 56/0045
                                                                        370/336
(Continued)

OTHER PUBLICATIONS

International Search Report issued in PCT/JP2017/017785 dated Jul. 25, 2017 (1 page).
(Continued)

*Primary Examiner* — Tuan H Nguyen
(74) *Attorney, Agent, or Firm* — Osha Bergman Watanabe & Burton LLP

(57) ABSTRACT

Provided are a radio communication system and user device that enable smooth interworking in a radio resource control (RRC) layer in the case of implementing interworking between systems by LTE assisted 5G, 5G assisted LTE, or the like. The radio communication system includes an eNB 100 conforming to LTE and a 5G-BS 200 conforming to 5G. The eNB 100 includes an RRC function unit 110 that performs control based on LTE-RRC, which is an RRC protocol in LTE. The 5G-BS 200 includes an RRC function unit 210 that performs control based on 5G-RRC, which is the RRC protocol in 5G. The RRC function unit 210 has at least a function not specified in LTE-RRC.

4 Claims, 7 Drawing Sheets

(51) Int. Cl.
  *H04W 88/06* (2009.01)
  *H04W 92/20* (2009.01)
  *H04W 88/08* (2009.01)
  *H04W 4/00* (2018.01)
  *H04W 72/04* (2009.01)
  *H04W 48/18* (2009.01)
  *H04W 92/02* (2009.01)

(52) U.S. Cl.
  CPC ............ *H04W 88/06* (2013.01); *H04W 88/08* (2013.01); *H04W 92/20* (2013.01); *H04W 92/02* (2013.01)

(58) Field of Classification Search
  CPC .............. H04W 24/10; H04W 36/0027; H04W 36/0033; H04W 36/0077; H04W 36/0088; H04W 36/08; H04W 36/14; H04W 36/32; H04W 48/16; H04W 48/18; H04W 48/20; H04W 60/005; H04W 60/00; H04W 68/02; H04W 72/04; H04W 72/085; H04W 76/10; H04W 76/16; H04W 76/27; H04W 76/28; H04W 88/06; H04W 88/08; H04W 92/02; H04W 92/20; H04W 4/80; H04W 68/00
  See application file for complete search history.

(56) References Cited

U.S. PATENT DOCUMENTS

| | | | |
|---|---|---|---|
| 2016/0249389 A1* | 8/2016 | Takahashi | H04L 5/0098 |
| 2016/0316435 A1* | 10/2016 | Guo | H04W 52/146 |
| 2017/0019930 A1* | 1/2017 | Lee | H04W 72/0413 |
| 2017/0150384 A1* | 5/2017 | Rune | H04W 36/0088 |
| 2017/0257183 A1* | 9/2017 | Vikberg | H04W 72/08 |
| 2018/0020418 A1* | 1/2018 | Chandramouli | H04W 16/14 |
| 2018/0092010 A1* | 3/2018 | Chandrashekar | H04W 48/16 |
| 2018/0227219 A1* | 8/2018 | Zhang | H04W 28/0273 |
| 2018/0359790 A1* | 12/2018 | Ingale | H04W 28/16 |

OTHER PUBLICATIONS

Written Opinion of the International Searching Authority issued in PCT/JP2017/017785 dated Jul. 25, 2017 (9 pages).
Samsung; "5G Radio Protocol Architecture"; 3GPP TSG-RAN WG2 Meeting #93bis, R2-162207; Dubrovnik, Croatia; Apr. 11-15, 2016 (9 pages).
CATT; "Interworking between LTE and 5G NR"; 3GPP TSG RAN WG2 Meeting #93bis, R2-162566; Dubrovnik, Croatia; Apr. 11-15, 2016 (4 pages).
3GPP TR 38.913 V0.3.0; "3rd Generation Partnership Project; Technical Specification Group Radio Access Network; Study on Scenarios and Requirements for Next Generation Access Technologies; (Release 14)"; Mar. 2016 (30 pages).
Extended European Search Report issued in counterpart European Patent Application No. 17796212.3, dated Oct. 8, 2019 (8 pages).
Samsung; "On the need of new DRB types in 5G"; 3GPP TSG-RAN WG2 Meeting #93bis, R2-162298; Dubrovnik, Croatia; Apr. 11-15, 2016 (3 pages).
Office Action issued in the counterpart European Patent Application No. 17796212.3, dated Feb. 11, 2021 (9 pages).
Office Action in counterpart Japanese Patent Application No. 2018-517071 dated Mar. 30, 2021 (5 pages).

* cited by examiner

RADIO COMMUNICATION SYSTEM AND USER DEVICE

TECHNICAL FIELD

The present invention relates to a radio communication system and user device, the radio communication system including a first radio base station conforming to a first radio communication method and a second radio base station conforming to a second radio communication method.

BACKGROUND ART

3rd Generation Partnership Project (3GPP) specifies, with the aim of further speeding Long Term Evolution (LTE), LTE-Advanced (hereinbelow, the LTE includes the LTE-Advanced). In addition, the 3GPP is also discussing a specification for a succeeding system of LTE, which is called, for example, 5th generation mobile communication system (5G) or a new RAT (NR) (hereinafter the succeeding system of LTE is explained as "5G").

In the study of the specification for the succeeding system, a higher level of interworking between LTE and 5G (Tight interworking between the new RAT and LTE) has been discussed as one of requirements (See Non-Patent Document 1, for example).

Specifically, the requirement is aggregation of data flows using an advanced mobility between radio access technologies (RATs) and dual connectivity (DC) between a radio base station of LTE (eNB, a first radio base station) and a radio base station of 5G (5G-BS, a second radio base station).

To implement such interworking, a scenario called LTE assisted 5G or 5G assisted LTE has been proposed.

LTE assisted 5G is a mode in which LTE assists 5G and in which interworking with a 5G-BS is performed under the initiative of an eNB. In contrast, 5G assisted LTE is a mode in which 5G assists LTE and in which interworking with an eNB is performed under the initiative of a 5G-BS.

In addition, in 5G, a radio resource control (RRC) protocol is employed for the layer 3 control between user device (UE) and a 5G-BS as in LTE, and an eNB and a 5G-BS are connected to each other with an inter-node interface comparable to X2 in LTE.

PRIOR ART DOCUMENT

Non-Patent Document

Non-Patent Document 1: 3GPP TR 38.913 V0.3.0 Section 8 "Requirements for architecture and migration of Next Generation Radio Access Technologies", 3rd Generation Partnership Project; Technical Specification Group Radio Access Network; Study on Scenarios and Requirements for Next Generation Access Technologies; (Release 14), 3GPP, March 2016

SUMMARY OF THE INVENTION

For implementing LTE assisted 5G or 5G assisted LTE described above, a difficult problem is to establish a specific way in which LTE or 5G in the RRC layer causes the other to start interworking.

Hence, the present invention has been made in view of the above situation, an objective thereof is to provide a radio communication system and user device that enable smooth interworking in a radio resource control (RRC) layer in the case of implementing interworking between systems by LTE assisted 5G, 5G assisted LTE, or the like.

An aspect of the present invention is a radio communication system (radio communication system 10) including: a first radio base station (eNB 100) conforming to a first radio communication method (LTE); and a second radio base station (5G-BS 200) conforming to a second radio communication method (5G), in which the first radio base station includes a first control function unit (RRC function unit 110) that performs control that is based on a first control protocol (LTE-RRC), which is a radio resource control protocol (RRC protocol) in the first radio communication method, the second radio base station includes a second control function unit (second RRC function unit 320) that performs control that is based on a second control protocol (5G-RRC), which is the radio resource control protocol in the second radio communication method, and the second control function unit has at least a function not specified in the first control protocol.

An aspect of the present invention is user device (UE 300) that performs radio communication with a radio communication system including a first radio base station conforming to a first radio communication method and a second radio base station conforming to a second radio communication method, including: a first control function unit (first RRC function unit 310) that performs control that is based on a first control protocol, which is a radio resource control protocol in the first radio communication method; a second control function unit (second RRC function unit 320) that performs control that is based on a second control protocol, which is the radio resource control protocol in the second radio communication method; and an interworking unit (interworking unit 330) that interconnects the first control function unit and the second control function unit, in which the first control function unit and the second control function unit are capable of operating in an active state simultaneously, either the first control function unit or the second control function unit serves as a master of the radio resource control protocol, and the first control function unit and the second control function unit exchange information that is based on the radio resource control protocol with each other via the interworking unit.

MODES FOR CARRYING OUT THE INVENTION

Next, an embodiment of the present invention will be described based on the drawings. Note that the same or similar reference signs denote the same or similar functions and structures, and descriptions thereof are omitted as appropriate.

(1) Overall Schematic Configuration of Radio Communication System

Figure 1:
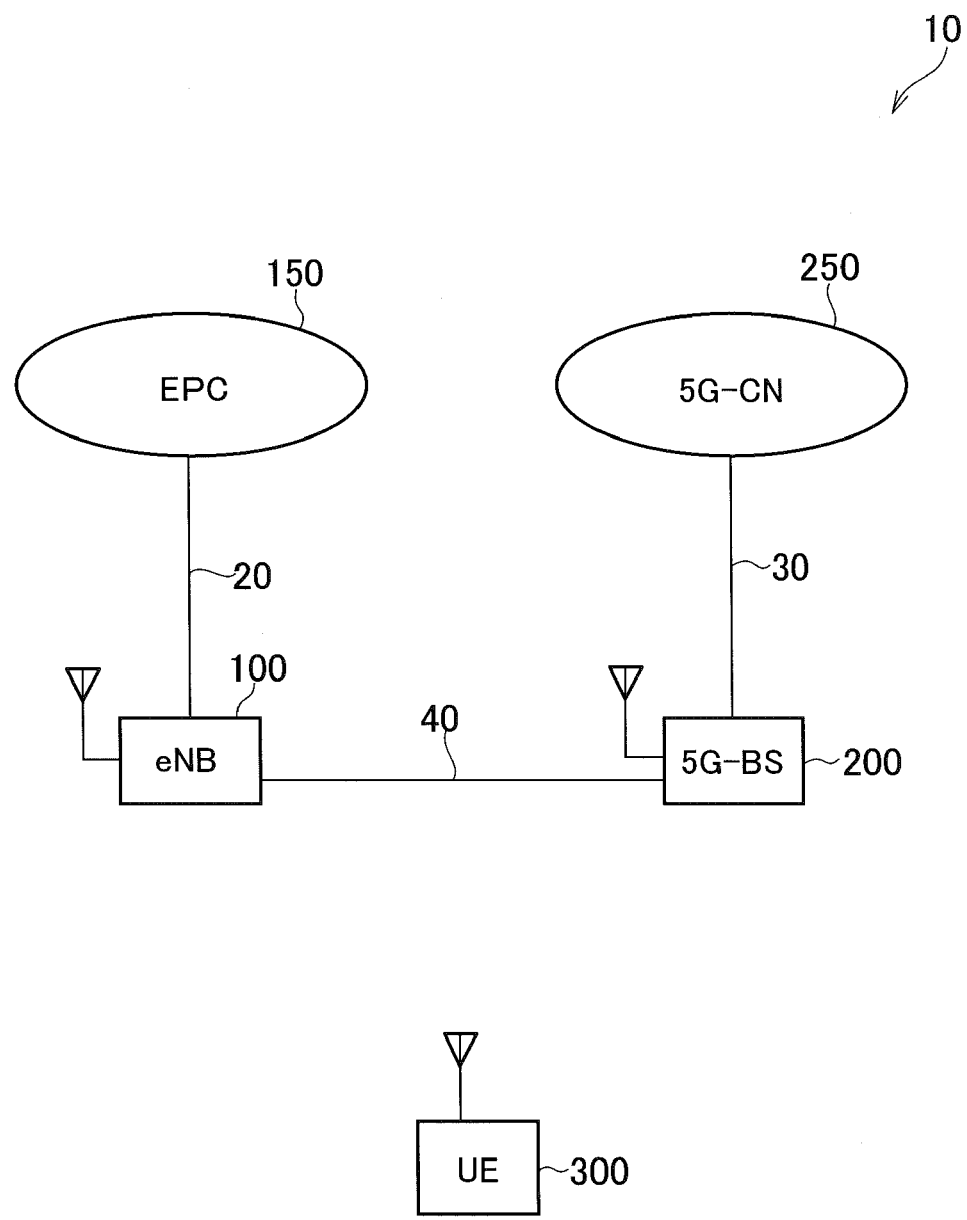
FIG. 1 is an overall schematic configuration diagram of a radio communication system 10.

FIG. 1 is an overall schematic configuration diagram of a radio communication system 10 according to the present embodiment. The radio communication system 10 conforms to "5G", which is the succeeding system of Long Term Evolution (LTE). Note that the radio communication system 10 may be referred to as future radio access (FRA) or a next generation system (NextGen).

The radio communication system 10 includes a radio base station 100 (hereinafter, eNB 100), a core network 150 (hereinafter, EPC 150), a radio base station 200 (hereinafter, 5G-BS 200), a core network 250 (hereinafter, 5G-CN 250), and user device 300 (hereinafter, UE 300).

The eNB 100 is a radio base station (first radio base station) conforming to LTE (a first radio communication method). The 5G-BS 200 is a radio base station (second radio base station) conforming to 5G (a second radio communication method).

The eNB 100 is connected to the EPC 150 (Evolved Packet Core), which is a core network of LTE. Specifically, the eNB 100 and the EPC 150 are connected to each other via a network IF 20 (RAN-CN Interface, for example, S1 interface).

The 5G-BS 200 is connected to the 5G-CN 250, which is a core network of 5G. Specifically, the 5G-BS 200 and the 5G-CN 250 are connected to each other via a network IF 30 (RAN-CN Interface, comparable to S1 interface).

For implementing interworking between LTE and 5G and other purposes, the eNB 100 and the 5G-BS 200 are connected via an inter-node IF 40. The inter-node IF 40 is an interface for connecting radio base stations (nodes) to each other, and is comparable to an X2 interface of LTE.

The UE 300 performs radio communication with the radio communication system 10. To be specific, in this embodiment, the UE 300 establishes RRC connection conforming to a radio resource control protocol and performs communication with the eNB 100 and the 5G-BS 200 using the established RRC connection.

Note that the radio resource control protocol (RRC protocol) only needs to be a protocol in layer 3, and may be simply called a control protocol or a layer 3 protocol.

In addition, the UE 300 is capable of dual connectivity (DC), which means that the UE 300 is capable of establishing RRC connections (in other words, being in a state of RRC CONNECTED) to perform radio communication with a master cell group (MCG) and a secondary cell group (SCB) simultaneously.

(2) Functional Block Configuration of Radio Communication System

Next, descriptions will be provided for the functional block configuration of the radio communication system 10. Specifically, the functional block configurations of the eNB 100, the 5G-BS 200, and the UE 300 will be described. Note that hereinafter descriptions will be mainly provided only for the functional blocks related to the present invention.

(2.1) eNB 100

Figure 2:
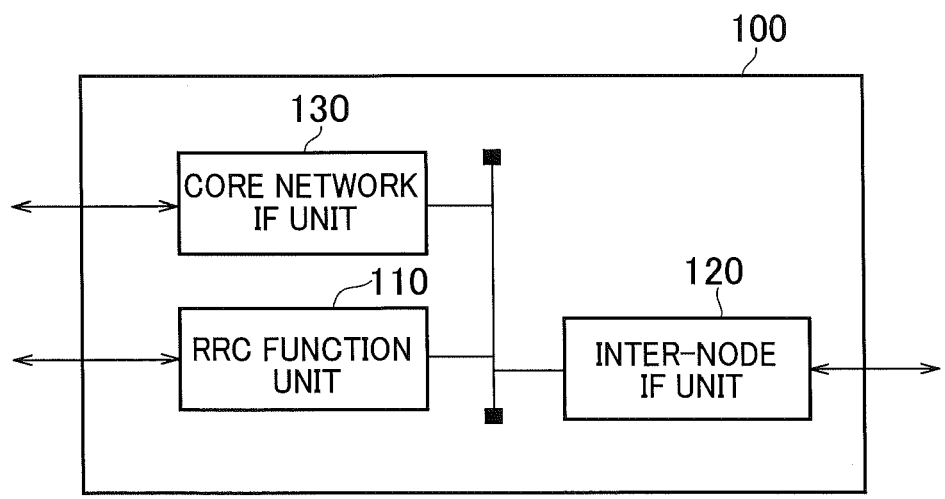
FIG. 2 is a functional block configuration diagram of an eNB 100.

FIG. 2 is a functional block configuration diagram of the eNB 100. As illustrated in FIG. 2, the eNB 100 includes an RRC function unit 110, an inter-node IF unit 120, and a core network IF unit 130.

The RRC function unit 110 performs control based on LTE-RRC (a first control protocol) which is an RRC protocol in LTE. Specifically, the RRC function unit 110 transmits and receives a message conforming to LTE-RRC (RRC message) to and from the UE 300 to establish, change, or delete the RRC connection.

The message can include a container that stores an information element conforming to 5G-RRC (a second control protocol), which is an RRC protocol in 5G. Note that the format and the like of the message will be described later.

The inter-node IF unit 120 is an interface for connecting the eNB 100 and the 5G-BS 200 to each other. The inter-node IF unit 120 provides various functions to perform communication between the eNB 100 and the 5G-BS 200.

The inter-node IF unit 120 can connect the eNB 100 and the 5G-BS 200 to each other in a layer higher than the RRC protocol. As describe above, the inter-node IF unit 120 is comparable to the X2 interface of LTE.

In other words, the RRC function unit 110 and an RRC function unit 210 of the 5G-BS 200 (not illustrated in FIG. 2, see FIG. 3) can transmit and receive information that is based on the RRC protocol via the inter-node IF 40 (see FIG. 1) connecting the eNB 100 and the 5G-BS 200 to each other in a layer higher than the RRC protocol.

The core network IF unit 130 is an interface for connecting the eNB 100 and the EPC 150 to each other. As described above, the core network IF unit 130 works with the network IF 20 (see FIG. 1) and provides various functions for performing communication between the eNB 100 and the EPC 150.

(2.2) 5G-BS 200

Figure 3:
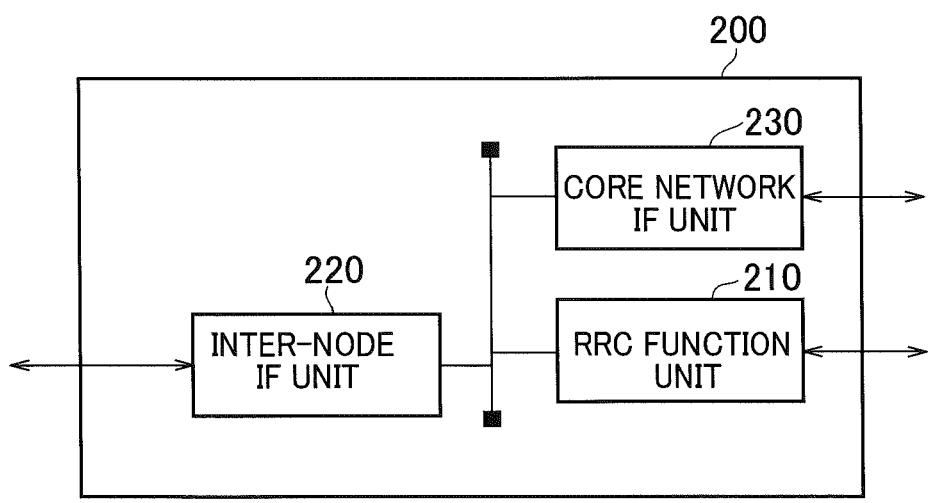
FIG. 3 is a functional block configuration diagram of a 5G-BS 200.

FIG. 3 is a functional block configuration diagram of the 5G-BS 200. As illustrated in FIG. 3, the 5G-BS 200 includes the RRC function unit 210 and an inter-node IF unit 220, and a core network IF unit 230.

The RRC function unit 210 performs control based on 5G-RRC (a second control protocol), which is an RRC protocol in 5G. Specifically, the RRC function unit 210 transmits and receives a message conforming to 5G-RRC (RRC message) to and from the UE 300 to perform processing on the RRC connection.

The message can include a container that stores an information element conforming to LTE-RRC. Note that the format and the like of the message will be described later.

Note that the RRC function unit 210 only needs to include at least functions not specified in LTE-RRC. This is because even though a function is not specified in 5G-RRC, if the function is specified in LTE-RRC, it is possible to utilize the function specified in LTE-RRC through interworking, which is described later. As a matter of course, the RRC function unit 210 (5G-RRC) may have functions that overlap with those of LTE-RRC.

The inter-node IF unit 220 is an interface for connecting the eNB 100 and the 5G-BS 200 to each other. The inter-node IF unit 220 provides various functions to perform communication between the eNB 100 and the 5G-BS 200 in the same way as the inter-node IF unit 120.

The inter-node IF unit 220 can connect the eNB 100 and the 5G-BS 200 to each other in a layer higher than the RRC protocol. As describe above, the inter-node IF unit 220 is comparable to the X2 interface of LTE.

The core network IF unit 230 is an interface for connecting the 5G-BS 200 and the 5G-CN 250 to each other. As described above, the core network IF unit 230 works with the network IF 30 (see FIG. 1) and provides various functions for performing communication between the eNB 100 and the EPC 150.

(2.3) UE 300

Figure 4:
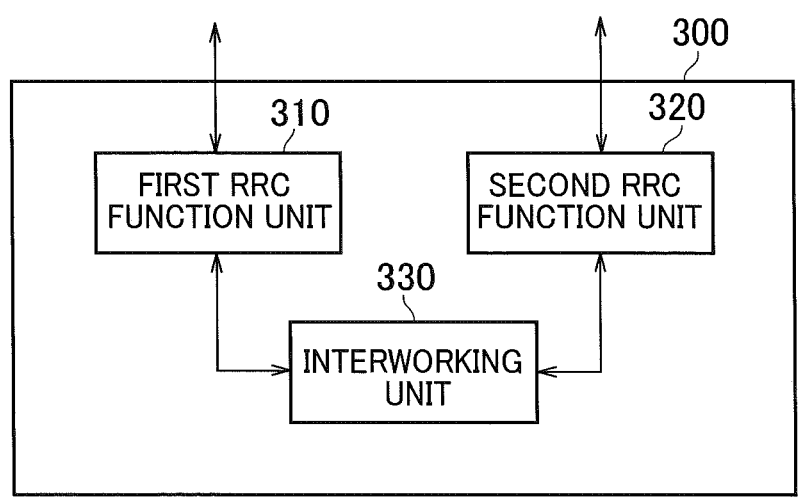
FIG. 4 is a functional block configuration diagram of UE 300.

FIG. 4 is a functional block configuration diagram of the UE 300. As illustrated in FIG. 4, the UE 300 includes a first RRC function unit 310, a second RRC function unit 320, and an interworking unit 330.

The first RRC function unit 310 performs control based on LTE-RRC. The second RRC function unit 320 performs control based on 5G-RRC.

The first RRC function unit 310 and the second RRC function unit 320 can operate simultaneously in an active state. In other words, the UE 300 is capable of performing radio communication with both LTE and 5G simultaneously. The first RRC function unit 310 sets radio parameters related to LTE RAT following LTE-RRC, and simultaneously the second RRC function unit 320 can set radio parameters related to 5G RAT following 5G-RRC.

When the UE 300 is connected to multiple RATS (for example, 3G and LTE), the RRC state (for example, an active state or an idle state) thereof may be controlled by either RAT.

Specifically, in the case of LTE assisted 5G, by completing a procedure for establishing the RRC connection from LTE-RRC, LTE-RRC and 5G-RRC become in the active state. By completing a procedure for releasing the RRC connection from LTE-RRC, LTE-RRC and 5G-RRC become in the idle state. In this case, 5G-RRC does not give any instruction on establishing and releasing the RRC connection.

Meanwhile, radio parameters unique to each RAT may be set using RRC of corresponding RAT. UE specific radio parameters related to LTE RAT are set using LTE-RRC, and UE specific radio parameters related to 5G RAT are set using 5G-RRC.

Note that either the first RRC function unit 310 or the second RRC function unit 320 preferably performs as a master of the RRC protocol. This makes it possible to support below-mentioned LTE assisted 5G and 5G assisted LTE sufficiently and smoothly also in performing dual connectivity (DC).

The interworking unit 330 interconnects the first RRC function unit 310 and the second RRC function unit 320, and provides functions for implementing interworking between the first RRC function unit 310 and the second RRC function unit 320.

The first RRC function unit 310 and the second RRC function unit 320 exchange information that is based on the RRC protocol (LTE-RRC or 5G-RRC) via the interworking unit 330.

(3) Interworking Structure

Next, descriptions will be provided for a structure of interworking between LTE and 5G with the radio communication system 10. Specifically, descriptions will be provided for basic structures of interworking and specific examples of interworking (LTE assisted 5G, 5G assisted LTE, and LTE/5G dedicated).

(3.1) Basic Structure

Figure 5:
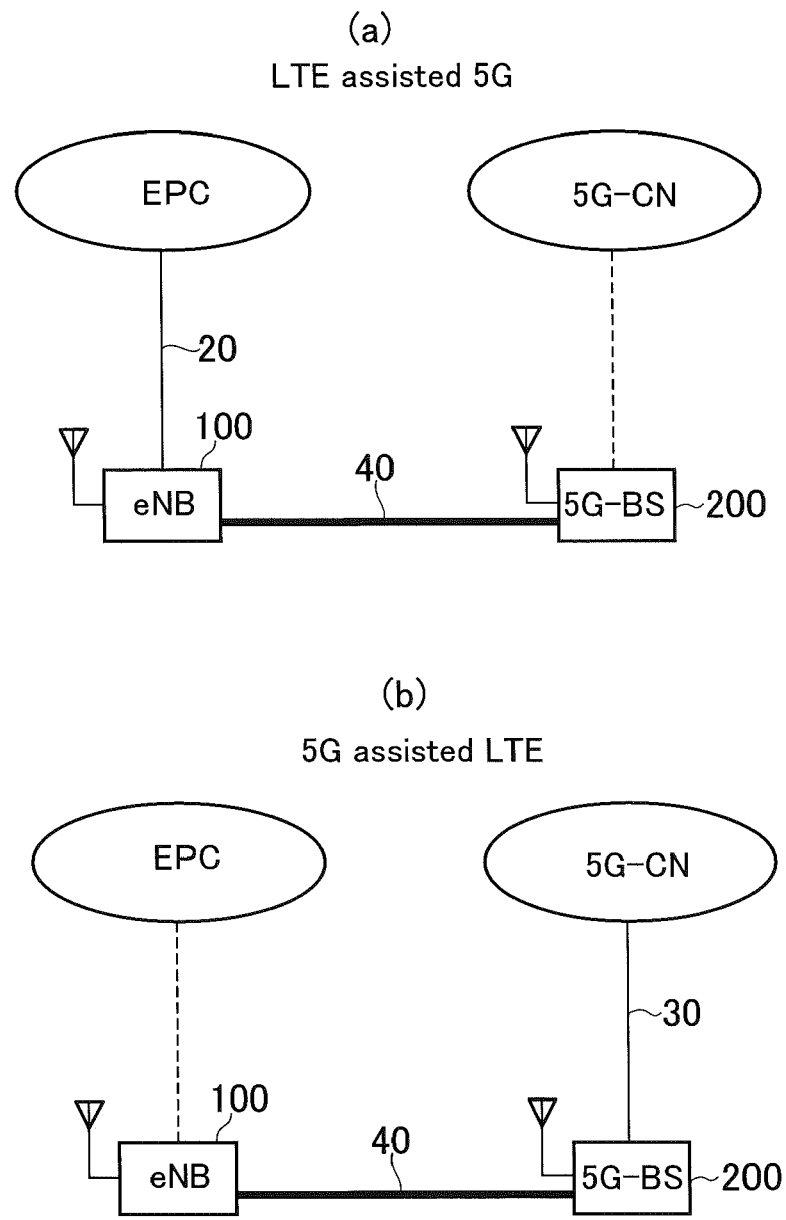
FIGS. 5(a) and 5(b) are diagrams illustrating basic structure examples of interworking.

FIGS. 5(a) and 5(b) illustrate basic structures of interworking. Specifically, FIG. 5(a) illustrates a structure of LTE assisted 5G, and FIG. 5(b) illustrates a structure of 5G assisted LTE.

As illustrated in FIG. 5(a), in the case of LTE assisted 5G, interworking between LTE and 5G is performed under the initiative of the eNB 100. The eNB 100 transmits and receives a control signal and the like to and from the EPC 150 via the network IF 20. In addition, the eNB 100 transmits and receives information that is based on the RRC protocol to or from the 5G-BS 200 via the inter-node IF 40.

In the case of LTE assisted 5G as described above, 5G-RRC only needs to have at least functions not specified in LTE-RRC, and does not need to have all the functions necessary for the RRC layer. In other words, in LTE assisted 5G, providing RRC functions by 5G alone (stand-alone) does not need to be supported.

As illustrated in FIG. 5(b), in the case of 5G assisted LTE, interworking between LTE and 5G is performed under the initiative of the 5G-BS 200. The 5G-BS 200 transmits and receives a control signal and the like to and from the 5G-CN 250 via the network IF 30. In addition, the 5G-BS 200 transmits and receives information that is based on the RRC protocol to or from the eNB 100 via the inter-node IF 40.

In 5G assisted LTE, to implement interworking between LIE and 5G, 5G-RRC has preferably all the functions necessary as the RRC layer (complete specification).

Note that without specifying 5G-RRC independently of LTE-RRC, it is possible to support 5G-RRC by adding functions necessary as the RRS layer, extending LTE-RRC (Non-critical extension), in other words, it is possible to implement interworking between LTE and 5G by revising the release of the conventional standard specification.

In addition, interworking between LTE and 5G uses dual connectivity as described above. Implementing the interworking involves using a Split bearer, which can be used for distributing user plane data to a secondary eNB (SeNB) by a master eNB (MeNB), and using a secondary cell group (SCG) bearer used for distributing the user plain data in the core network.

Moreover, more various services are expected in 5G, such as enhanced mobile broadband (eMBB), massive machine type communications (mMTC), and ultra-reliable and low latency communications (URLLC). Interworking between LTE and 5G described in this embodiment is also applicable to those services.

(3.2) LTE Assisted 5G

Figure 6:
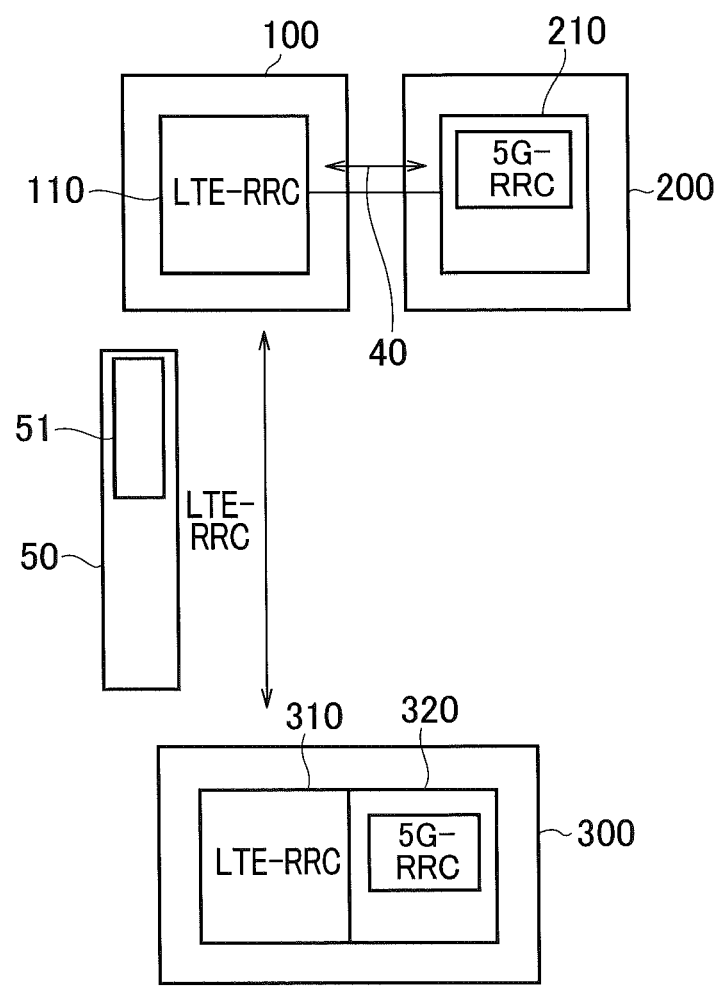
FIG. 6 is a conceptual diagram of interworking in an RRC layer by LTE assisted 5G.

FIG. 6 is a conceptual diagram of interworking in the RRC layer by LTE assisted 5G. As illustrated in FIG. 6, in LTE assisted 5G, the eNB 100 (RRC function unit 110) and the UE 300 (first RRC function unit 310) transmit and receive an RRC message 50 conforming to LTE-RRC to and from each other.

The RRC function unit 110 performs coordination with the RRC function unit 210 of the 5G-BS 200 via the inter-node IF 40, which is necessary for simultaneous communication with the UE 300.

In the case of dual connectivity (DC), the eNB 100 serves as the MeNB and the 5G-BS 200 serves as the SeNB. The eNB 100 cannot recognize 5G-RRC, accordingly cannot understand the configuration set by the 5G-BS 200. For this reason, UE capability as the entire UE 300 and uplink (UL) power control (UL power control) between the MeNB and the SeNB are difficult.

To address this, the eNB 100 performs necessary coordination with the 5G-BS 200 via the inter-node IF 40 as described above. The contents of the coordination include UE capability and UL power control described above, and the number of data radio bearers (DRBs). The timing for the coordination may be any timing before setting DC with the SeNB (5G-BS 200), after the setting, or during the setting.

In addition, the RRC message 50 can include a container 51 that stores an information element (information element related the above-described coordination) conforming to 5G-RRC. Specifically, SCG-NR-ConfigContainer is provided extending RRC Connection Reconfiguration of LTE.

Note that SCG-NR-ConfigContainer may be called SCG-5G-ConfigContainer. Or alternatively, without providing such a container, a new RRC message may be defined in LTE-RRC for transmitting and receiving the information element conforming to 5G-RRC.

Specifically, a signaling radio bearer (SRB) for transmitting and receiving the RRC message is established between the UE 300 and the eNB 100, and an RRC message of LTE including an RRC message of 5G is transmitted and received via the SRB. An SRB does not need to be established between the UE 300 and the 5G-BS 200.

The first RRC function unit 310 of the UE 300 can store and retrieve the information element conforming to 5G-RRC into and from the container 51 with the second RRC function unit 320.

(3.3) 5G Assisted LTE

Figure 7:
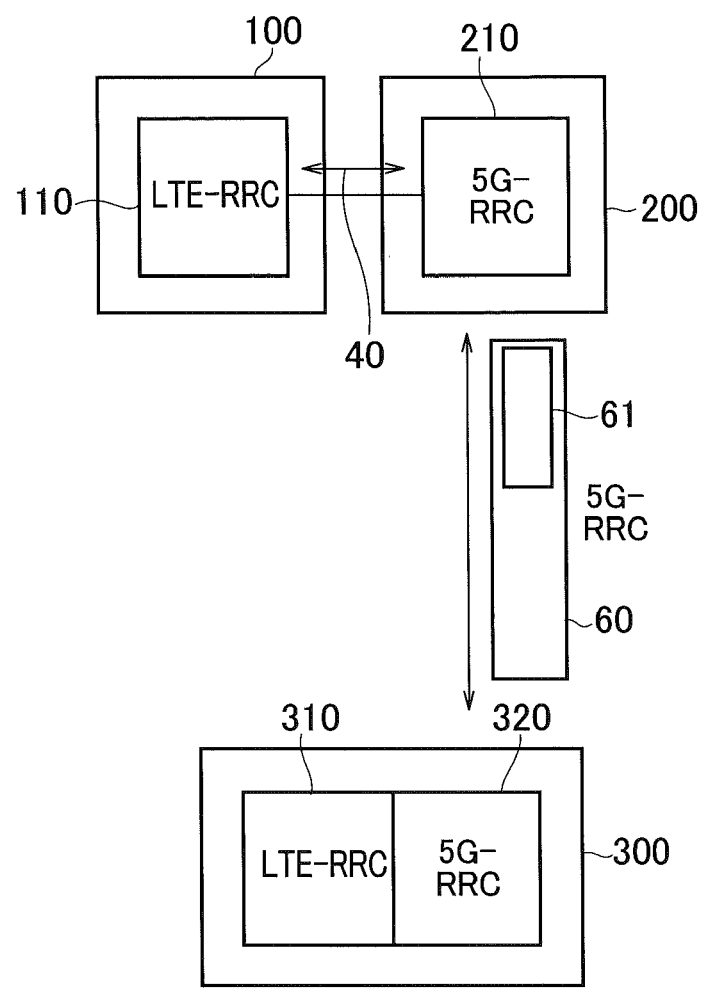
FIG. 7 is a conceptual diagram of interworking in the RRC layer by 5G assisted LTE.

FIG. 7 is a conceptual diagram of interworking in the RRC layer by 5G assisted LTE. As illustrated in FIG. 7, in 5G assisted LTE, the 5G-BS 200 (RRC function unit 210) and the UE 300 (second RRC function unit 320) transmit and receive an RRC message 60 conforming to 5G-RRC to and from each other.

The RRC function unit 210 performs coordination with the RRC function unit 110 of the eNB 100 via the inter-node IF 40, which is necessary for simultaneous communication with the UE 300. Note that in 5G assisted LTE as described above, 5G-RRC has preferably all the functions necessary as the RRC layer (complete specification) to perform interworking between LTE and 5G.

In addition, the RRC message 60 can include a container 61 that stores an information element (information element related the above-described coordination) conforming to LTE-RRC. Specifically, SCG-LTE-ConfigContainer is provided extending RRC Connection Reconfiguration of 5G. Or alternatively, without providing such a container, a new RRC message may be defined in 5G-RRC for transmitting and receiving the information element conforming to LTE-RRC.

Specifically, an SRB for transmitting and receiving the RRC message is established between the UE 300 and the 5G-BS 200, and an RRC message of 5G including an RRC message of LTE is transmitted and received via the SRB. An SRB does not need to be established between the UE 300 and the eNB 100.

(3.4) LTE/5G Dedicated

Figure 8:
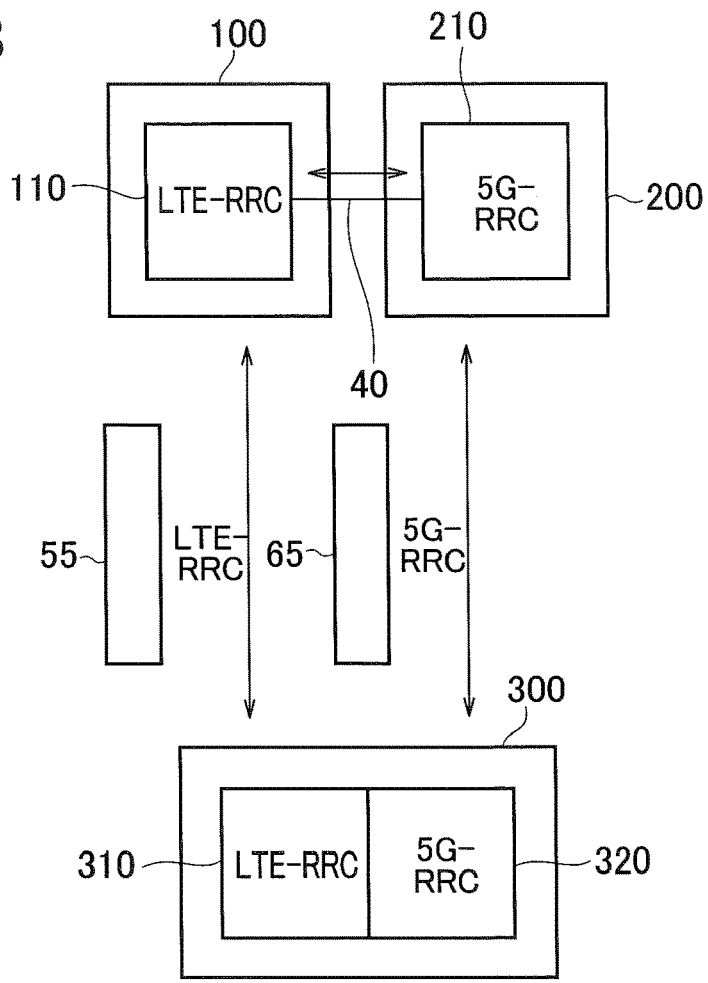
FIG. 8 is a conceptual diagram of interworking in the RRC layer using dedicated RRC messages of LTE/5G.

FIG. 8 is a conceptual diagram of interworking in the RRC layer using dedicated RRC messages of LTE/5G.

As illustrated in FIG. 8, the eNB 100 (RRC function unit 110) and the UE 300 (first RRC function unit 310) transmit and receive an RRC message 55 conforming to LTE-RRC to and from each other. In addition, the 5G-BS 200 (RRC function unit 210) and the UE 300 (second RRC function unit 320) transmit and receive an RRC message 65 conforming to 5G-RRC to and from each other.

This interworking is applicable to the structures for LTE assisted 5G and 5G assisted LTE described above. Although the RRC messages conforming to LTE-RRC and 5G-RRC are transmitted and received in this interworking, the state of the RRC layer (RRC IDLE, RRC CONNECTED) between the UE 300 and the core network is managed by either RAT (LTE or 5G) serving as the main RAT, and the above-described RRC messages 55, 56 are transmitted and received for managing the state of the RRC layer and the RRC connection.

In addition, in this interworking, broadcast information is acquired based on the RRC of the RAT working as the main RAT (LTE-RRC or 5G-RRC). Note, in the case of DC, a dedicated RRC message may be transmitted and received conforming to the respective RRC (LTE-RRC or 5G-RRC). Here, an SRB may be established for the radio base station of each RAT (the eNB 100 or the 5G-BS 200).

Note that although the UE 300 can connect with both RATs (LTE and 5G), an RRC message may be transmitted and received via only one SRB with either radio base station (the eNB 100 or the 5G-BS 200). In addition, although the UE 300 can connect with both RATs (LTE and 5G), RRC messages may be transmitted and received via the respective SRBs.

For example, when the 5G-BS 200 is the SeNB, the information element: SCG-NR-Config IE (may also be called SCB-5G-Config IE) may be transmitted in RRC Connection Reconfiguration conforming to 5G-RRC using the SRB established by the 5G-BS 200, and MCG-Config IE may be transmitted using the SRB established by the eNB 100.

In the same way, when the eNB 100 is the SeNB, SCG-LTE-Config IE may be transmitted in RRC Connection Reconfiguration conforming to LTE-RRC using the SRB established by the eNB 100, and MCG-Config IE may be transmitted using the SRB established by the 5G-BS 200.

Also in this interworking, the RRC function unit 110 and the RRC function unit 210 perform coordination necessary for simultaneous communication with the UE 300 via the inter-node IF 40.

(4) Advantageous Effect

According to the embodiments described above, the following advantageous effect can be obtained. Specifically, the RRC function unit 210 of the 5G-BS 200 performs control based on 5G-RRC and has at least functions not specified in LTE-RRC.

For this reason, even if a function is not specified in 5G-RRC, if the function is specified in LTE-RRC, it is possible to utilize the function specified in LTE-RRC through interworking between LTE and 5G as described above. This enables smooth interworking in the RRC layer when implementing interworking between systems by LTE assisted 5G, 5G assisted LTE, or the like.

Further, these features narrow down functions to be specified as 5G-RRC and reduce the development cost and the development time, which can contribute to the introduction and promotion of 5G.

In this embodiment, the RRC function unit 110 of the eNB 100 and the RRC function unit 210 of the 5G-BS 200 can transmit and receive information that is based on the RRC protocol to and from each other via the inter-node IF 40 that connects the eNB 100 and the 5G-BS 200 in a layer higher than the RRC protocol.

In addition, the first RRC function unit 310 and the second RRC function unit 320 of the UE 300 can operate in the active state simultaneously, and either the first RRC function unit 310 or the second RRC function unit 320 serves as the master of the RRC protocol. Further, the first RRC function unit 310 and the second RRC function unit 320 exchange information that is based on the RRC protocol with each other via the interworking unit 330.

This makes it possible to perform coordination on the radio resource control between LTE-RRC and 5G-RRC. This enables smoother interworking in the RRC layer.

In this embodiment, the RRC message 50 (see FIG. 6) can include the container 51 that stores an information element conforming to 5G-RRC. In the same way, the RRC message 60 (see FIG. 7) can include the container 61 that stores an information element conforming to LTE-RRC.

This enables interworking with 5G-RRC when using the RRC message 50 conforming to LTE-RRC, and interworking with LTE-RRC when using the RRC message 60 conforming to 5G-RRC.

(5) Other Embodiments

Although the details of the present invention have been disclosed along with the embodiments as above, the present invention is not limited to the above descriptions. It is apparent to those skilled in the art that various modifications and improvements thereto are possible.

For example, the block diagram used for explaining the above embodiments illustrates a functional block diagram. These functional blocks (constituent sections) are implemented by an arbitrary combination of hardware and/or software. In addition, the method of implementing each functional block is not particularly limited. In other words, functional blocks may be implemented either by a single device formed of physical and/or logical combinations, or by multiple devices formed by connecting directly and/or indirectly (for example with wires and/or wirelessly) two or more devices physically and/or logically separated.

Figure 9:
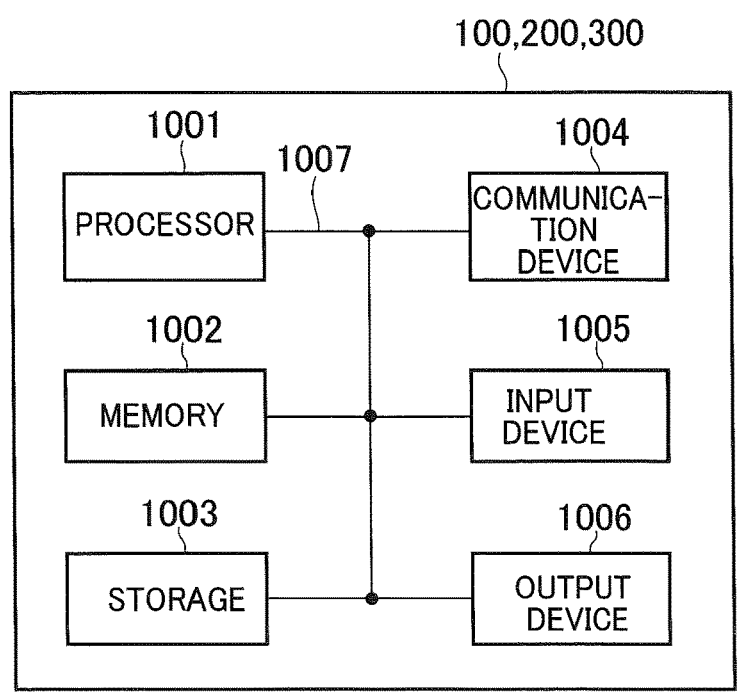
FIG. 9 is a diagram illustrating an example of a hardware structure of the eNB 100, the 5G-BS 200, and the UE 300.

Moreover, the eNB 100, the 5G-BS 200, and the UE 300 described above may function as computers that perform processing of the radio communication method according to the present invention. FIG. 9 is a diagram illustrating an example of a hardware structure of the eNB 100, the 5G-BS 200, and the UE 300. As illustrated in FIG. 9, each of the eNB 100, the 5G-BS 200, and the UE 300 may be configured as a computer device including a processor 1001, a memory 1002, a storage 1003, a communication device 1004, an input device 1005, an output device 1006, a bus 1007, and the like.

The processor 1001, for example, controls the entire computer, running an operating system. The processor 1001 may be formed of a central processing unit (CPU) including an interface with peripheral devices, a control device, a computation device, a register, and the like.

The memory 1002 is a computer-readable recording medium, which may be formed of at least one of, for example, ROM (read only memory), EPROM (erasable programmable ROM), EEPROM (electrically erasable programmable ROM), RAM (random access memory), and the like. The memory 1002 may be called a register, a cache, a main memory, or the like. The memory 1002 is capable of storing a program (program codes), and a software module, and the like that can execute a method according to the embodiments described above.

The storage 1003 is a computer-readable recording medium, which may be formed of at least one of, for example, an optical disc such as a CD-ROM (Compact Disc ROM), a hard disk drive, a flexible disk, a magneto-optical disk (for example, a Compact Disc, a Digital Versatile Disc, a Blu-ray (registered trade mark) Disc), a smart card, a flash memory (for example, a card, a stick, a key drive), a floppy (registered trade mark) disk, a magnetic strip, and the like. The storage 1003 may be called an auxiliary storage device. The above described memory medium may be, for example, a database, a server, or another suitable medium including the memory 1002 and/or the storage 1003.

The communication device 1004 is hardware (a transmission reception device) for communication between computers via a wired and/or wireless network, and is also called, for example, a network device, a network controller, a network card, a communication module or the like.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. Note that the input device 1005 and the output device 1006 may be integrated into a single unit (for example, a touch panel).

In addition, the devices such as the processor 1001 and the memory 1002 are connected to each other with the bus 1007 to communicate information. The bus 1007 may be formed of a single bus or formed of multiple different buses depending on the devices.

In addition, the method of communicating information is not limited to the embodiments described above, but other methods can be used. For example, the communication of information may be implemented with physical layer signaling (for example, downlink control information (DCI), uplink control information (UCI)), upper layer signaling (for example, RRC signaling, medium access control (MAC) signaling, broadcast information (master information block (MIB)), system information block (SIB)), or other signals, or combinations of these. RRC signaling may be called an RRC message, and may be, for example, an RRC Connection Setup message, an RRC Connection Reconfiguration message, or the like.

Moreover, inputted or outputted information may be stored in a specific location (for example, a memory), or may be managed with a management table. Inputted or outputted information can be overwritten or updated, or additional information can be added to it. Outputted information may be deleted. Inputted information may be transferred to another device.

The sequences, flowcharts, and the like in the embodiments described above may be rearranged in order unless it causes a contradiction.

In addition, a certain operation performed by the eNB 100, the 5G-BS 200, and the UE 300 in the above-described embodiments is performed by another network node (device) in some cases. Moreover, the functions of the eNB 100, the 5G-BS 200, and the UE 300 may be provided by a combination of other multiple network nodes.

Note that the terms used in the descriptions of this specification and/or terms necessary to understand this specification may be replaced with terms having the same or similar meanings. For example, a channel and/or a symbol may be a signal, or a signal may be a message. In addition, the terms "system" and "network" may be used interchangeably.

Moreover, the above-described parameters and the like may be expressed by absolute values, by relative values from specified values, or by other associated information. For example, radio resources may be instructed by an index.

The eNB 100 and the 5G-BS 200 (base stations) can accommodate one or more (for example, three) cells (also called sectors). When a base station has multiple cells, the entire coverage area of the base station can be divided into multiple smaller areas. Each smaller area can also provide communication services using a subsystem of the base station (for example, an indoor small base station RRH: remote radio head).

The term "cell" or "sector" means part or the whole of the coverage area provided by a base station and/or a subsystem of the base station that provide communication services in this coverage. Further, the terms "base station", "eNB", "cell", and "sector" can be used interchangeably in this specification. In some cases, a base station (BS) is also called terms such as a fixed station, a NodeB, an eNodeB (eNB), an access point, a femtocell, and a small cell.

The UE 300 is also called in some cases by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

"The expression "based on" used in this specification does not mean "based only on" unless explicitly stated otherwise. In other words, the expression "based on" means both "based only on" and "based at least on".

In addition, the terms "including", "comprising", and other variations thereof are intended to be comprehensive as with "comprise". Moreover, the term "or" used in this specification or the scope of claims is intended not to be exclusive disjunction.

Although the embodiments of the present invention have been described as above, it should not be understood that the descriptions and the drawings that constitute part of this disclosure limit the present invention. From this disclosure, various alternative embodiments, examples, and operation techniques will be easily found by those skilled in the art.

Note that the entire contents of Japanese Patent Application No. 2016-096560 (filed on May 12, 2016) are incorporated in this specification by reference.

INDUSTRIAL APPLICABILITY

The radio communication system and the user device described above enable smooth interworking in the radio resource control (RRC) layer in the case of implementing interworking between systems by LTE assisted 5G, 5G assisted LTE, or the like.

REFERENCE SIGNS LIST 10 radio communication system
20, 30 network IF
40 inter-node IF
50 RRC message
51 container
55, 60 RRC message
61 container
65 RRC message
100 eNB
110 RRC function unit
120 inter-node IF unit
130 core network IF unit
150 EPC
200 5G-BS
210 RRC function unit
220 inter-node IF unit
230 core network IF unit
250 5G-CN
300 UE
310 first RRC function unit
320 second RRC function unit
330 interworking unit

The invention claimed is:
1. A radio communication system performing dual connectivity with a terminal, comprising:
a first radio base station conforming to a first radio communication method as a master; and
a second radio base station conforming to a second radio communication method as a secondary, wherein
the first radio base station includes a first control function unit that performs control based on a first radio resource control protocol in the first radio communication method,
the second radio base station includes a second control function unit that performs control based on a second radio resource control protocol in the second radio communication method, wherein
the first control function unit transmits and receives a message conforming to the first radio resource control protocol with the terminal, the message includes an information element conforming to the second radio resource control protocol,
the first radio base station performs coordination with the second radio base station about capability of the terminal, wherein the coordination is performed via an inter-node interface connecting the first radio base station and the second radio base station, and wherein the coordination is necessary for the dual connectivity.
2. The radio communication system according to claim 1, wherein the coordination is also about uplink power control at the terminal for the secondary.
3. A terminal that performs radio communication with a radio communication system including a first radio base station conforming to a first radio communication method and a second radio base station conforming to a second radio communication method, comprising:
a first control function unit that performs control that is based on a first control protocol, which is a radio resource control protocol in the first radio communication method; and
a second control function unit that performs control based on a second control protocol which is the radio resource control protocol in the second radio communication method, wherein the first control function unit and the second control function unit are capable of operating in an active state simultaneously,
either the first control function unit or the second control function unit serves as a master of the radio resource control protocol, and
the first control function unit and the second control function unit exchange information based on the radio resource control protocol with each other within the terminal.
4. A radio base station, comprising:
a first control function unit that performs control based on a first radio resource control protocol in the first radio communication method, and
an inter-node interface unit that performs coordination with a second radio base station conforming to a second radio communication method via an inter-node interface connecting the radio base station and the second radio base station, the coordination being necessary for dual connectivity with a terminal,
wherein the coordination between the radio base station and the second radio base station is about capability of the terminal, and
wherein the first control function unit transmits and receives a message conforming to the first radio resource control protocol with the terminal, the mes- sage includes an information element conforming to the second radio resource control protocol.

\* \* \* \* \*